US012699631B2

(12) United States Patent
Awasthi et al.

(10) Patent No.: US 12,699,631 B2

(45) Date of Patent: Aug. 4, 2026

(54) HIGH AVAILABILITY SYSTEM OUTAGE RECOVERY

(71) Applicant: Capital One Services, LLC, McLean, VA (US)

(72) Inventors: Ateet Kumar Awasthi, McKinney, TX (US); Chris Fields, Roanoke, TX (US); Saral Jain, Mckinney, TX (US); Matt Howarth, Garland, TX (US); Kiran Sai Veerubhotla, Little Elm, TX (US); Vedhasree Periathambi, McKinney, TX (US)

(73) Assignee: Capital One Services, LLC, McLean, VA (US)

( * ) Notice: Subject to any disclaimer, the term of this patent is extended or adjusted under 35 U.S.C. 154(b) by 43 days.

(21) Appl. No.: 18/407,926

(22) Filed: Jan. 9, 2024

(65) Prior Publication Data

US 2025/0225032 A1    Jul. 10, 2025

(51) Int. Cl.
*G06F 11/07* (2006.01)
*G06F 11/14* (2006.01)
*G06F 11/1446* (2026.01)

(52) U.S. Cl.
CPC ...... *G06F 11/1415* (2013.01); *G06F 11/0793* (2013.01); *G06F 11/1469* (2013.01); *G06F 2201/805* (2013.01)

(58) Field of Classification Search
CPC .. G06F 11/1415; G06F 11/0793; G06F 11/07; G06F 11/3055; H04L 41/0866; H04L 41/0869
See application file for complete search history.

(56) References Cited

U.S. PATENT DOCUMENTS

| | | | | | |
|---|---|---|---|---|---|
| 11,775,907 B1 | * | 10/2023 | Recck | .................. | G06Q 10/067 |
| | | | | | 714/2 |
| 2006/0050629 | A1 * | 3/2006 | Saika | .................. | H04L 43/0817 |
| | | | | | 709/201 |
| 2009/0119536 | A1 * | 5/2009 | Guo | .................... | H04L 67/1034 |
| | | | | | 714/E11.01 |
| 2009/0279673 | A1 * | 11/2009 | Maffre | .................... | H04L 43/50 |
| | | | | | 379/27.01 |

(Continued)

FOREIGN PATENT DOCUMENTS

| | | | | | |
|---|---|---|---|---|---|
| EP | | 3113449 A1 | * | 1/2017 | ......... H04L 67/1034 |
| JP | 2003256399 A | | * | 9/2003 | |

*Primary Examiner* — Yolanda L Wilson

(74) *Attorney, Agent, or Firm* — Harrity & Harrity, LLP

(57) ABSTRACT

In some implementations, a recovery system may detect a trigger to generate a system resource document for a target system. The recovery system may communicate, based on detecting the trigger to generate the system resource document, with a set of resources of the target system to perform an auto-discovery procedure. The recovery system may generate the system resource document identifying the set of resources of the target system. The recovery system may store the system resource document in a recovery archive. The recovery system may detect an outage event. The recovery system may obtain, based on detecting the outage event, the system resource document from the recovery archive. The recovery system may fail over the set of resources of the target system to a new target system. The recovery system may transmit a set of notifications associated with the new target system.

20 Claims, 6 Drawing Sheets

400 →

410 ~ Detect a trigger to generate a system resource document for a target system 420 ~ Communicate, by the recovery system and based on detecting the trigger to generate the system resource document, with a set of resources of the target system to perform an auto-discovery procedure 430 ~ Generate, by the recovery system based on a result of the auto-discovery procedure, the system resource document identifying the set of resources of the target system 440 ~ Store, by the recovery system, the system resource document in a recovery archive 450 ~ Detect, after storing the system resource document in the recovery archive, an outage event 460 ~ Obtain, by the recovery system and based on detecting the outage event, the system resource document from the recovery archive 470 ~ Fail over, by the recovery system, the set of resources of the target system to a new target system 480 ~ Transmit, by the recovery system, a set of notifications associated with the new target system

(56)        References Cited

U.S. PATENT DOCUMENTS

| 2010/0042869 | A1* | 2/2010 | Szabo | ..................... | G06F 8/656 |
| | | | | | 717/171 |
| 2017/0083433 | A1* | 3/2017 | Ray | ..................... | G06F 11/3692 |
| 2019/0146862 | A1* | 5/2019 | Kephart | ............. | G06F 11/0709 |
| | | | | | 714/2 |

* cited by examiner

200

400

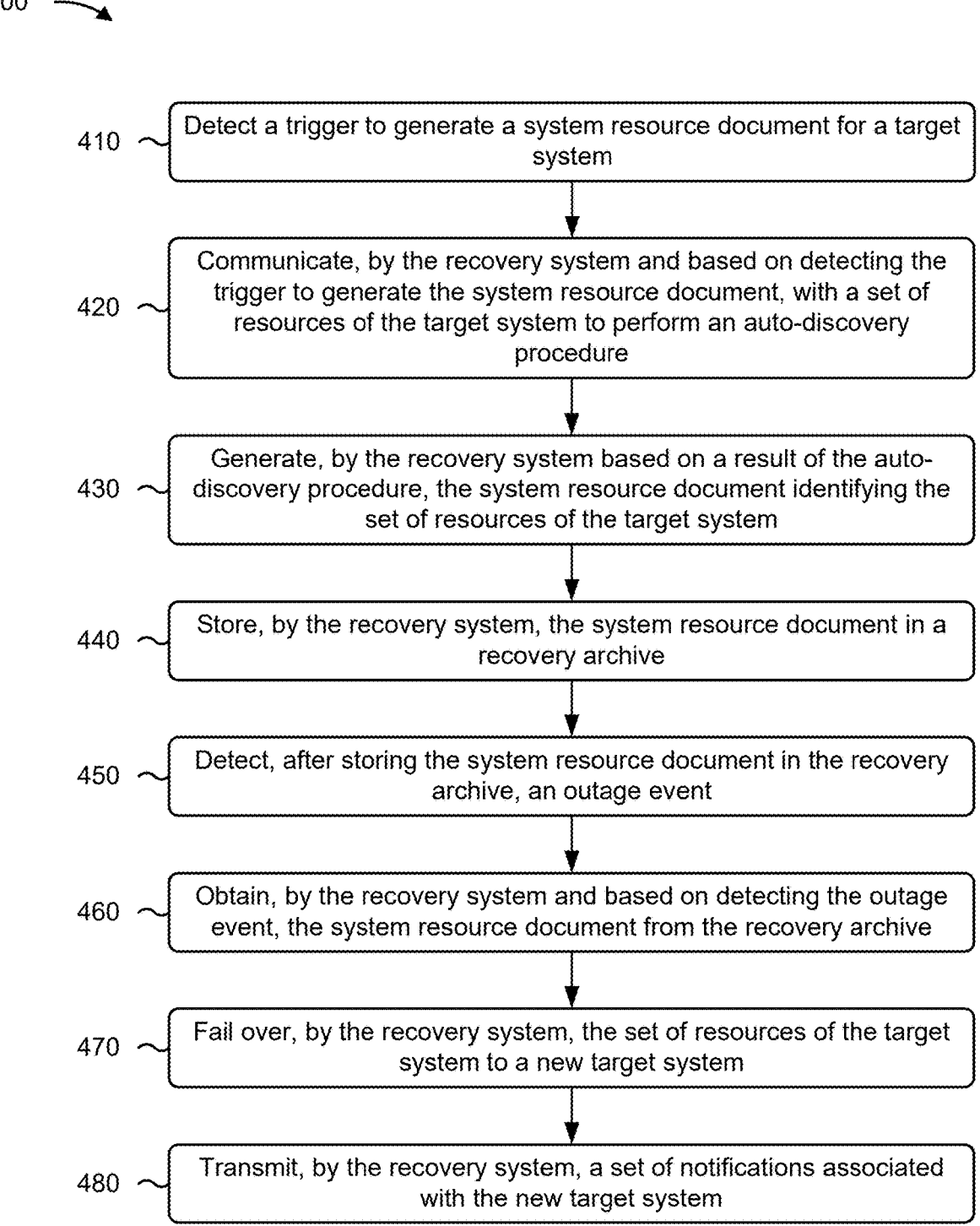

410 — Detect a trigger to generate a system resource document for a target system 420 — Communicate, by the recovery system and based on detecting the trigger to generate the system resource document, with a set of resources of the target system to perform an auto-discovery procedure 430 — Generate, by the recovery system based on a result of the auto-discovery procedure, the system resource document identifying the set of resources of the target system 440 — Store, by the recovery system, the system resource document in a recovery archive 450 — Detect, after storing the system resource document in the recovery archive, an outage event 460 — Obtain, by the recovery system and based on detecting the outage event, the system resource document from the recovery archive 470 — Fail over, by the recovery system, the set of resources of the target system to a new target system 480 — Transmit, by the recovery system, a set of notifications associated with the new target system

FIG. 4

HIGH AVAILABILITY SYSTEM OUTAGE RECOVERY

BACKGROUND

Some devices may have recovery procedures for recovery after an outage. For example, a computer device may have one or more software components that restart the computer device and re-initialize one or more programs in a startup list. The computer device may persist a state of one or more programs. For example, the computer device may, when an unexpected outage occurs, return a program to a state that the program was in prior to the outage.

SUMMARY

Some implementations described herein relate to a recovery system for high availability system outage recovery. The recovery system may include one or more memories and one or more processors communicatively coupled to the one or more memories. The one or more processors may be configured to detect a trigger to generate a system resource document for a target system. The one or more processors may be configured to communicate, based on detecting the trigger to generate the system resource document, with a set of resources of the target system to perform an auto-discovery procedure. The one or more processors may be configured to generate, based on a result of the auto-discovery procedure, the system resource document identifying the set of resources of the target system. The one or more processors may be configured to store the system resource document in a recovery archive. The one or more processors may be configured to detect, after storing the system resource document in the recovery archive, an outage event. The one or more processors may be configured to obtain, based on detecting the outage event, the system resource document from the recovery archive. The one or more processors may be configured to transmit a set of signals to execute a set of recovery actions on the set of resources of the target system, using the system resource document recovered from the recovery archive, to re-instantiate one or more resources, of the set of resources, on a new target system.

Some implementations described herein relate to a non-transitory computer-readable medium that stores a set of instructions. The set of instructions, when executed by one or more processors of a recovery system, may cause the recovery system to detect a trigger to generate a system resource document for a target system. The set of instructions, when executed by one or more processors of the recovery system, may cause the recovery system to auto-discover, based on detecting the trigger to generate the system resource document, a set of resources of the target system. The set of instructions, when executed by one or more processors of the recovery system, may cause the recovery system to determine, for the set of resources of the target system, a set of attributes. The set of instructions, when executed by one or more processors of the recovery system, may cause the recovery system to generate, for the set of resources of the target system, a set of auto-discovery files. The set of instructions, when executed by one or more processors of the recovery system, may cause the recovery system to encapsulate the set of auto-discovery files in the system resource document. The set of instructions, when executed by one or more processors of the recovery system, may cause the recovery system to store the system resource document in a recovery archive. The set of instructions, when executed by one or more processors of the recovery system, may cause the recovery system to detect, after storing the system resource document in the recovery archive, an outage event. The set of instructions, when executed by one or more processors of the recovery system, may cause the recovery system to obtain, based on detecting the outage event, the system resource document from the recovery archive. The set of instructions, when executed by one or more processors of the recovery system, may cause the recovery system to transmit a set of signals to cause a set of recovery actions on the set of resources of the target system, using the set of auto-discovery files encapsulated in the system resource document to re-instantiate one or more resources, of the set of resources, on a new target system.

Some implementations described herein relate to a method. The method may include detecting, by a recovery system, a trigger to generate a system resource document for a target system. The method may include communicating, by the recovery system and based on detecting the trigger to generate the system resource document, with a set of resources of the target system to perform an auto-discovery procedure. The method may include generating, by the recovery system based on a result of the auto-discovery procedure, the system resource document identifying the set of resources of the target system. The method may include storing, by the recovery system, the system resource document in a recovery archive. The method may include detecting, after storing the system resource document in the recovery archive, an outage event. The method may include obtaining, by the recovery system and based on detecting the outage event, the system resource document from the recovery archive. The method may include failing over, by the recovery system, the set of resources of the target system to a new target system. The method may include transmitting, by the recovery system, a set of notifications associated with the new target system.

BRIEF DESCRIPTION OF THE DRAWINGS

FIG. 4 is a flowchart of an example process associated with high availability system outage recovery, in accordance with some embodiments of the present disclosure.

DETAILED DESCRIPTION

The following detailed description of example implementations refers to the accompanying drawings. The same reference numbers in different drawings may identify the same or similar elements.

A cloud computing system may include resources that are instantiated and assigned to provide a group of programs, use of applications, access to data structures, or other services. For example, a cloud computing system may include programs that are operated to provide interfaces between client devices (e.g., being used by a group of system users) and a backend (e.g., a set of data structures that the programs access to obtain and provide information). Periodically, a cloud computing system may experience an outage. When an outage occurs, the cloud computing system may perform a recovery procedure that includes re-starting one or more programs, re-allocating one or more resources, and re-configuring one or more connections to one or more client devices. Such outages may be unplanned outages (e.g., as a result of an error, such as a system crash, or environmental factor, such as a power outage) or planned outages (e.g., test outages). However, when an outage occurs, an amount of time to complete a recovery may result in a delay in providing services to users. Moreover, an amount of signaling to re-establish connections to client devices may result in excessive utilization of network traffic. Accordingly, it may be desirable to provide a high-availability pipeline to facilitate automated outage recovery.

Some implementations described herein enable improved reliability for computing systems experiencing outages. For example, some implementations described herein may provide an automated pipeline that is pre-configured to enable recovery of a target system when an outage is detected. As a result, an amount of downtime associated with the target system may be reduced relative to other recovery procedures that do not pre-configure recovery parameters in advance of an outage. Additionally, or alternatively, the target system may store information identifying network addresses and connection information, which may reduce an amount of signaling associated with recovery from an outage. Some implementations may use highly available architecture, such as containerized redundant components, modules, and/or services to ensure that the recovery pipeline is available to recover from an outage without being overloaded, as may occur with other types of recovery pipelines.

Figure 1A:
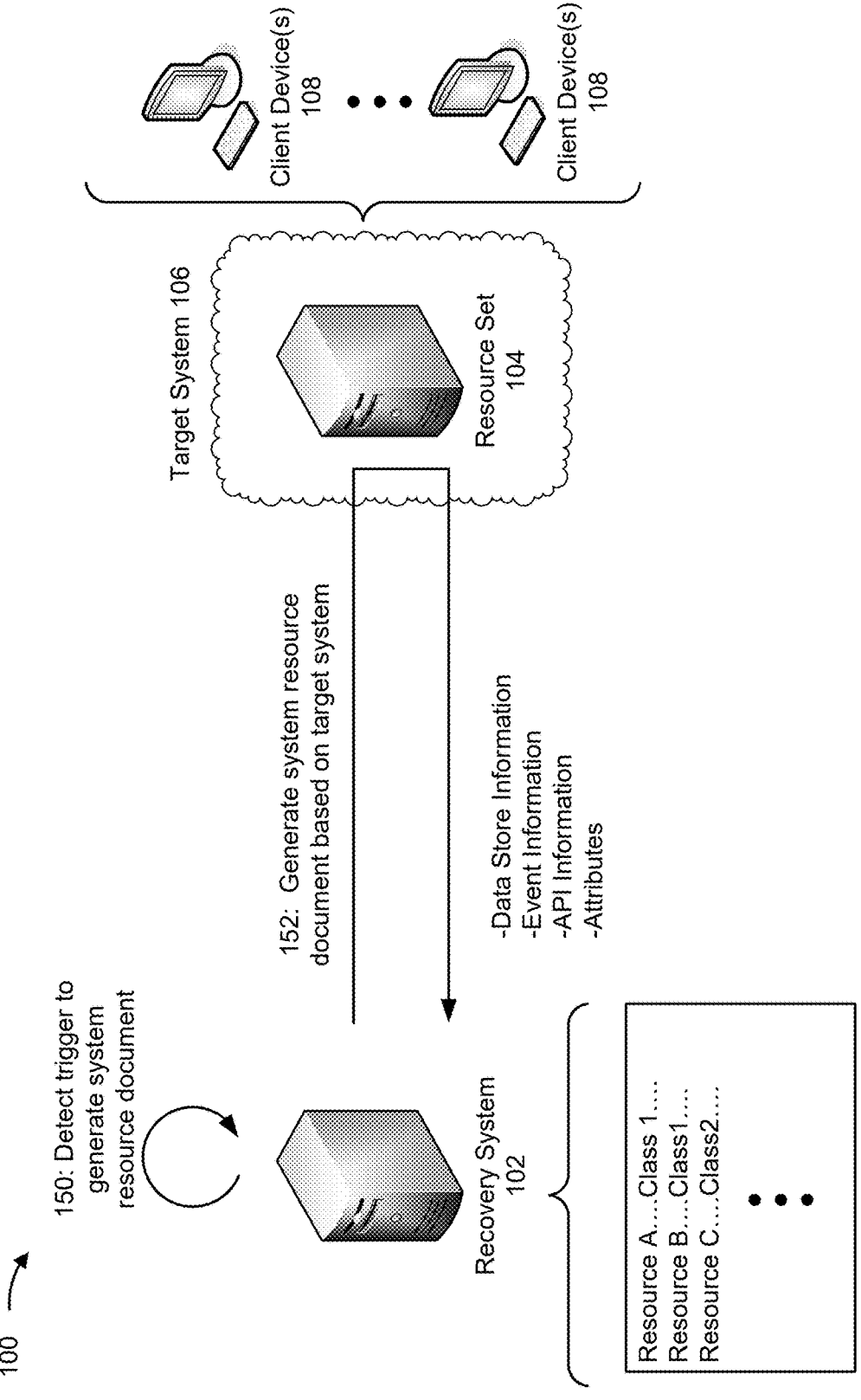
FIGS. 1A-1C are diagrams of an example implementation associated with high availability system outage recovery, in accordance with some embodiments of the present disclosure.
Figure 1B:
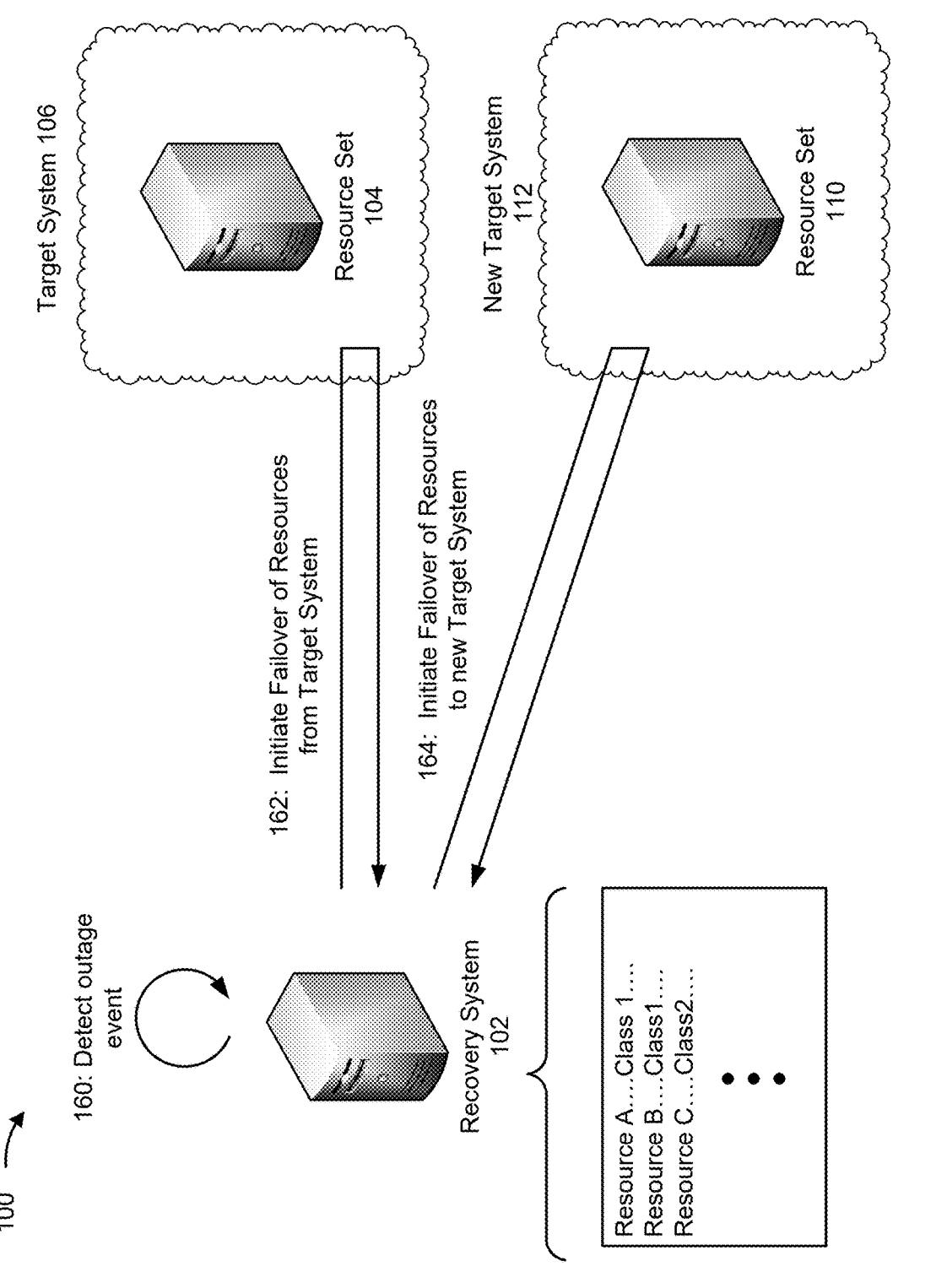
Figure 1C:
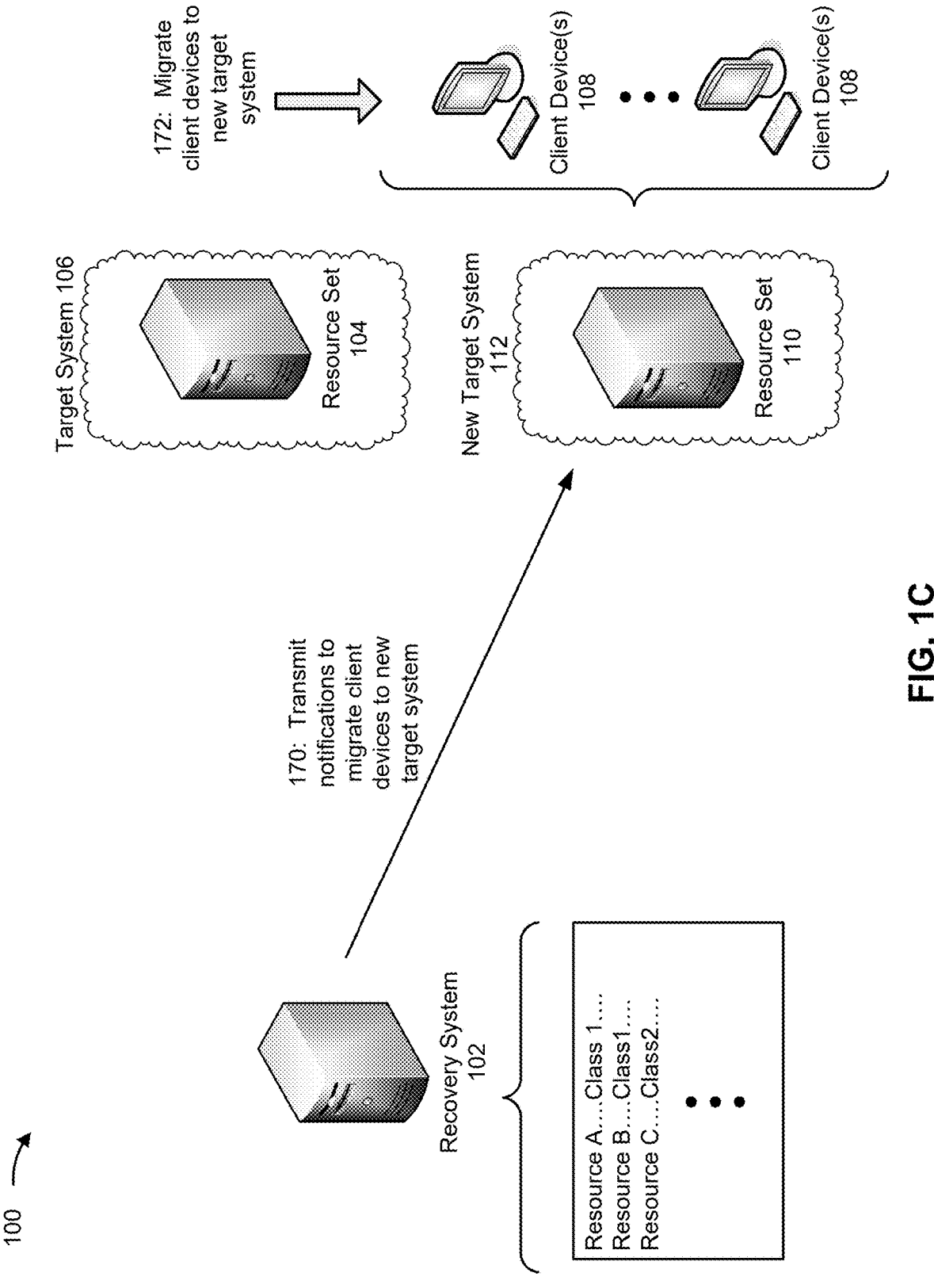

FIGS. 1A-1C are diagrams of an example implementation 100 associated with high availability system outage recovery. As shown in FIGS. 1A-1C, example implementation 100 includes a recovery system 102, a resource set 104 of a target system 106, and a set of client devices 108. These devices are described in more detail below in connection with FIG. 2 and FIG. 3. In some implementations, the resource set 104 may include one or more cloud applications or cloud resources deployed on a cloud network.

As further shown in FIG. 1A, and by reference number 150, the recovery system 102 may detect a trigger to generate a system resource document. For example, the recovery system 102 may determine that a new system resource document is to be generated or that an existing system resource document is to be updated. In some implementations, the recovery system 102 may detect a periodic trigger to generate a system resource document. For example, the recovery system 102 may be configured with a timer for generating and/or updating the system resource document and may determine to generate the system resource document when the timer has elapsed. Additionally, or alternatively, the recovery system 102 may determine that a periodic test (e.g., a test outage) is scheduled to occur and may generate the system resource document before the periodic test occurs.

Additionally, or alternatively, the recovery system 102 may detect a trigger to generate a system resource document based on measurement information. For example, the recovery system 102 may determine that one or more metrics associated with the target system 106 are indicative of a potential outage being predicted to occur and may generate the system resource document in advance of the potential outage occurring. In other words, the recovery system 102 may input one or more metrics associated with the target system 106, such as a resource status, a quantity of connections, or another parameter, into a machine learning model and may generate a prediction of whether an outage is to occur. When an outage is predicted to occur (e.g., with a threshold certainty or within a threshold period of time), the recovery system 102 may pre-emptively generate a system resource document to prepare for the predicted outage.

As further shown in FIG. 1A, and by reference number 152, the recovery system 102 may generate the system resource document based on the target system 106. For example, the recovery system 102 may communicate with the resource set 104 and the target system 106 to auto-discover and store information identifying one or more characteristics of the resource set 104 and the target system 106. In some implementations, the recovery system 102 may identify services associated with the target system 106. For example, the recovery system 102 may call one or more functions of the target system 106 (e.g., perform one or more application programming interface (API) calls) to identify a set of services or processing functions of the target system 106. Additionally, or alternatively, the recovery system 102 may identify one or more data structures of the target system 106. For example, the recovery system 102 may call one or more functions of the target system 106 to determine one or more data structures that are deployed on the target system 106 or that are being accessed by the set of services or processing functions of the target system 106.

In some implementations, the recovery system 102 may determine one or more scanning parameters associated with one or more services, functions, or data structures. For example, the recovery system 102 may determine a compliance policy associated with the one or more services, functions, or data structures and may determine one or more scanning services that are associated with fulfilling the compliance policy. In some implementations, the recovery system 102 may determine an endpoint attribute, such as one or more network addresses, associated with the target system 106. For example, the recovery system 102 may determine a domain name service (DNS) mapping attribute, a set of canonical names (CNAMEs) for the DNS mapping, a set of Internet Protocol (IP) addresses, or a set of medium access control (MAC) addresses, among other examples, that are being used by the target system 106 or are being used to access the target system 106. Additionally, or alternatively, the recovery system 102 may determine a system architecture of the target system 106. For example, the recovery system 102 may determine one or more dependencies, clusters, or other relationships between components and/or resources of the resource set 104 and the target system 106. In this case, the recovery system 102 may determine a relational database service (RDS) attribute of the target system 106, such as one or more RDSs that are configured for the target system 106. Additionally, or alternatively, the recovery system 102 may determine one or more events associated with the target system 106. For example, the recovery system 102 may determine one or more periodic processes or triggers that, when satisfied, cause the target system 106 to perform one or more tasks. Additionally, or alternatively, the recovery system 102 may determine one or more APIs associated with the target system 106.

In some implementations, the recovery system 102 may identify resiliency tier information. A resiliency tier attribute may correspond to a level of resiliency that is provided for a service, function, or data structure, such as a frequency of backup, a priority of resource allocation, or another parameter associated with ensuring that high resiliency tier components are provided resources over low resiliency tier components when resources are limited. Although some aspects are described in terms of high resiliency tier and low resiliency tier components, other levels of resiliency tiers may be used. For example, the recovery system 102 may determine a resiliency tier for a set of services, functions, data structures, or other information, which the recovery system 102 may use to allocate resources or establish backup procedures when recovering target system 106 from an outage.

In some implementations, the recovery system 102 may perform a validation procedure. For example, the recovery system 102 may pre-validate input files, which are components of the system recovery document, for format, writer endpoint, and/or mapping. Additionally, or alternatively, the recovery system 102 may test one or more network addresses to determine an accuracy of the one or more network addresses. Additionally, or alternatively, the recovery system 102 may communicate with one or more other available target systems or resource sets to determine whether the one or more other available target systems or resource sets has sufficient available resources to recover the target system 106 from an outage.

In some implementations, the recovery system 102 may store the system recovery document. For example, the recovery system 102 may store one or more files that include information characterizing the target system 106. In this case, the system recovery document may include information identifying resources, services, APIs, processing functions, databases, datastores, relationships, network connections, prioritizations, or other attributes of the target system 106. In some implementations, the recovery system 102 may update an existing system resource document. For example, the recovery system 102 may modify one or more portions of a system resource document to indicate a change to one or more attributes of the target system 106.

As shown in FIG. 1B, and by reference number 160, the recovery system 102 may detect an outage event. For example, the recovery system 102 may detect a non-testing event type of outage by receiving a message, from the target system 106, indicating that an outage event is occurring. Additionally, or alternatively, the recovery system 102 may determine that an outage event is occurring based on not receiving a message. For example, the target system 106 may be configured to transmit a message indicating that an outage is not occurring during a configured monitoring period. In this case, when the recovery system 102 attempts to receive the message, but does not receive the message (e.g., associated with canceling triggering of an outage event) during the configured monitoring period, the recovery system 102 may determine that an outage is occurring. In some implementations, the recovery system 102 may determine that an outage is occurring based on one or more metrics associated with the target system 106. For example, the recovery system 102 may monitor resource utilizations or network activity associated with the target system 106 and determine that an outage is occurring when a deviation (e.g., relative to baseline activity) is detected in the resource utilizations or the network activity.

Additionally, or alternatively, the recovery system 102 may predict that an outage is going to occur. For example, the recovery system 102 may use a machine learning model to process resource utilization or network activity data to predict a likelihood of an outage within a configured period of time. In this case, when the likelihood of an outage is greater than a threshold percentage within the configured period of time, the recovery system 102 may pre-emptively determine that an outage event is occurring and pre-emptively recover the target system 106.

In some implementations, the recovery system 102 may detect a testing event type of outage event. For example, the recovery system 102 may periodically test recovery procedures by artificially declaring that an outage is occurring (e.g., when an outage is not occurring) to enable the recovery system 102 to test recovery of the target system 106. In this case, the recovery system 102 may test recovery procedures at randomly selected times or in accordance with a configured periodicity. Additionally, or alternatively, the recovery system 102 may test recovery procedures in accordance with a usage criterion. For example, the recovery system 102 may test recovery procedures when a level of usage of the target system 106 is less than a threshold amount, to avoid an interruption in services being provided. Additionally, or alternatively, the recovery system 102 may test recovery procedures at a particular time, such as outside of a configured availability period (e.g., outside of business hours) to avoid an interruption in services being provided.

As further shown in FIG. 1B, and by reference numbers 162 and 164, the recovery system 102 may initiate a failover of the resource set 104 from the target system 106. For example, the recovery system 102 may instantiate and/or assign a resource set 110 within a new target system 112 to recover from an outage associated with the resource set 104 of the target system 106. In some implementations, the recovery system 102 may orchestrate a transition from the target system 106 to the target system 112 to recover from an outage. For example, the recovery system 102 may stop or start one or more services, communicate using one or more fail over APIs, communicate with one or more remote systems, communicate with one or more data structures, communicate with one or more resource allocators, or communicate with one or more event components, among other examples, to migrate the target system 106 in accordance with the system resource document. In this case, the recovery system 102 may access the system resource document and use information included therein, which is pre-configured and pre-validated, to perform a set of calls and instantiate a set of resources to recover the target system 106 as the target system 112.

In some implementations, the recovery system 102 may migrate one or more applications without stopping inbound traffic. For example, the recovery system 102 may call one or more services, such as an API, a relational database, a content delivery network, or a scheduler associated with re-instantiating one or more applications. In some implementations, the recovery system 102 may migrate one or more applications with a stop to inbound traffic. For example, the recovery system 102 may communicate with the client devices 108 to stop inbound traffic, perform a set of calls to recover the one or more applications, and may communicate with the client devices 108 to restart inbound traffic. In some implementations, whether the recovery system 102 performs a recovery action that includes stopping inbound traffic or not is based on a class of resource. For example, for a particular class of resource (e.g., a high reliability service), the recovery system 102 may recover the resource without stopping inbound traffic. For another class of resource (e.g., a low reliability service), the recovery system 102 may resume an application and recover the resource with stopping of inbound traffic.

In some implementations, the recovery system 102 may order recovery in accordance with one or more reliability tiers. For example, the recovery system 102 may recover high reliability services or data structures before low reliability services or data structures. In some implementations, as shown in FIG. 1C by reference numbers 170 and 172, the recovery system 102 may transmit a set of notifications to migrate client devices 108 from the target system 106 to the new target system 112. For example, the recovery system 102 may update a webpage to indicate that the target system 106 is recovered. Additionally, or alternatively, the recovery system 102 may restart inbound traffic that has been stopped after recovery of the target system 106 as the target system 112. Additionally, or alternatively, the recovery system 102 may transmit one or more signals to execute another type of recovery action, such as transmitting a signal to the target system 112 to cause the target system 112 to activate one or more services. Additionally, or alternatively, the recovery system 102 may transmit one or more signals to cause the client devices 108 to switch from accessing one or more network addresses associated with the target system 106 to using one or more network addresses associated with the target system 112.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
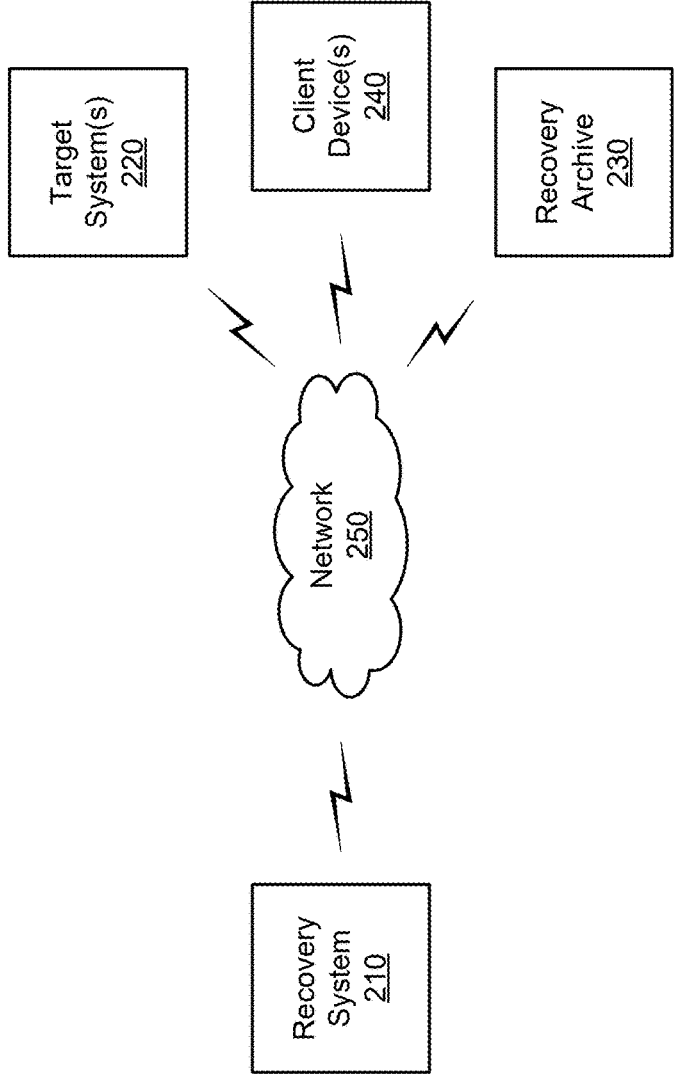
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a recovery system 210, one or more target systems 220, a recovery archive 230, one or more client devices 240, and a network 250. Devices of environment 200 may interconnect via wired connections, wireless connections, or a combination of wired and wireless connections.

The recovery system 210 may include one or more devices capable of receiving, generating, storing, process-ing, providing, and/or routing information associated with recovery of a high availability system, as described else-where herein. The recovery system 210 may include a communication device and/or a computing device. For example, the recovery system 210 may include a server, such as an application server, a client server, a web server, a database server, a host server, a proxy server, a virtual server (e.g., executing on computing hardware), or a server in a cloud computing system. In some implementations, the recovery system 210 may include computing hardware used in a cloud computing environment. In some implementa-tions, the recovery system 210 may correspond to the recovery system 102 of FIGS. 1A-1C.

The target system 220 may include one or more devices capable of receiving, generating, storing, processing, pro-viding, and/or routing information associated with providing one or more services, as described elsewhere herein. The target system 220 may include a communication device and/or a computing device. For example, the target system 220 may include a server, such as an application server, a client server, a web server, a database server, a host server, a proxy server, a virtual server (e.g., executing on computing hardware), or a server in a cloud computing system. In some implementations, the target system 220 may include computing hardware used in a cloud computing environment. In some implementations, the target system 220 may corre-spond to the target system 106 or the new target system 112 of FIGS. 1A-1C.

The recovery archive 230 may include one or more devices capable of receiving, generating, storing, process-ing, and/or providing information associated with recovery of a high availability system, as described elsewhere herein. The recovery archive 230 may include a communication device and/or a computing device. For example, the recov-ery archive 230 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environ-ment, or a similar type of device. As an example, the recovery archive 230 may store a system resource document identifying resources of a high availability system, as described elsewhere herein.

The client device 240 may include one or more devices capable of receiving, generating, storing, processing, and/or providing information associated with using a high avail-ability system, as described elsewhere herein. The client device 240 may include a communication device and/or a computing device. For example, the client device 240 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. In some implementations, the client device 240 may correspond to the client devices 108 of FIGS. 1A-1C.

The network 250 may include one or more wired and/or wireless networks. For example, the network 250 may include a wireless wide area network (e.g., a cellular net-work or a public land mobile network), a local area network (e.g., a wired local area network or a wireless local area network (WLAN), such as a Wi-Fi network), a personal area network (e.g., a Bluetooth network), a near-field communi-cation network, a telephone network, a private network, the Internet, and/or a combination of these or other types of networks. The network 250 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
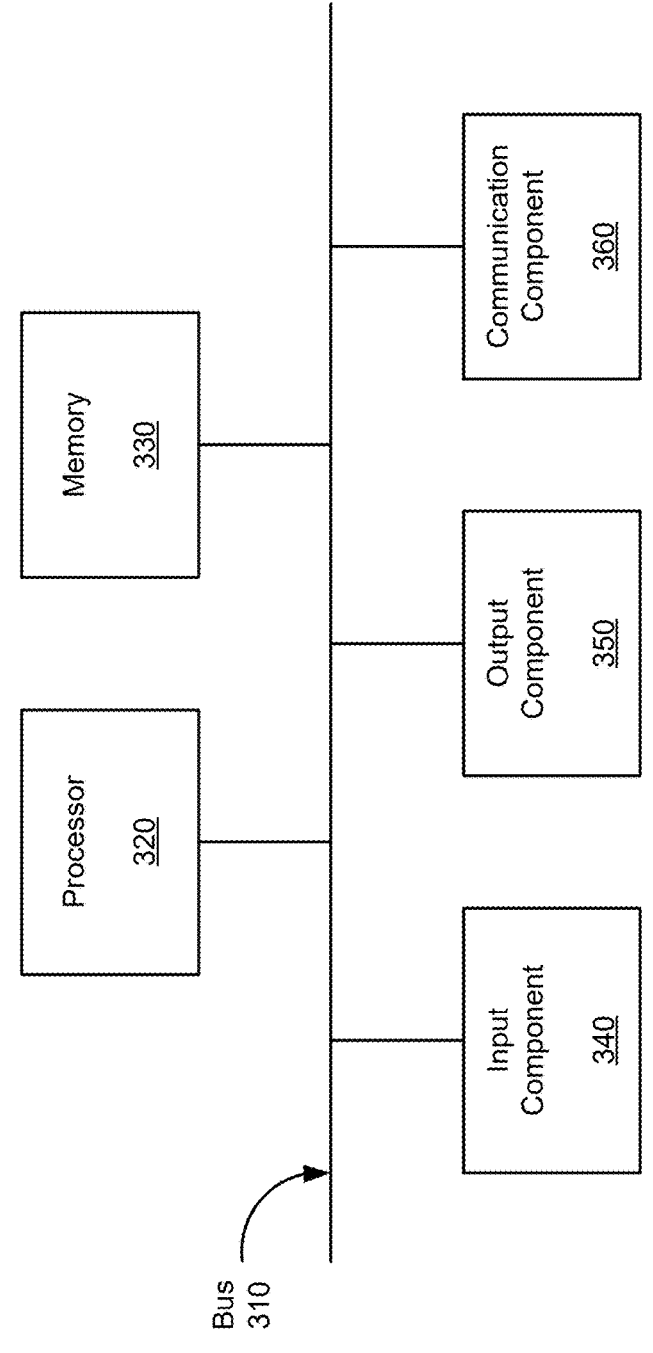
FIG. 3 is a diagram of example components of a device associated with high availability system outage recovery, in accordance with some embodiments of the present disclosure.

FIG. 3 is a diagram of example components of a device 300 associated with high availability system outage recov-ery. The device 300 may correspond to the recovery system 210, the target systems 220, the recovery archive 230, and/or the client devices 240. In some implementations, the recov-ery system 210, the target systems 220, the recovery archive 230, and/or the client devices 240 may include one or more devices 300 and/or one or more components of the device 300. As shown in FIG. 3, the device 300 may include a bus

310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with high availability system outage recovery. In some implementations, one or more process blocks of FIG. 4 may be performed by the recovery system 210. In some implementations, one or more process blocks of FIG. 4 may be performed by another device or a group of devices separate from or including the recovery system 210, such as the target systems 220, the recovery archive 230, and/or the client devices 240. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include detecting a trigger to generate a system resource document for a target system (block 410). For example, the recovery system 210 (e.g., using processor 320 and/or memory 330) may detect a trigger to generate a system resource document for a target system, as described above in connection with reference number 150 of FIG. 1A. As an example, the recovery system 210 may determine that a threshold period of time has elapsed from a last generation of a system resource document and may trigger updating of the system resource document.

As further shown in FIG. 4, process 400 may include communicating, based on detecting the trigger to generate the system resource document, with a set of resources of the target system to perform an auto-discovery procedure (block 420). For example, the recovery system 210 (e.g., using processor 320 and/or memory 330) may communicate, based on detecting the trigger to generate the system resource document, with a set of resources of the target system to perform an auto-discovery procedure, as described above in connection with reference number 152 of FIG. 1A. As an example, the recovery system 210 may communicate with one or more resources of the target system 220 to determine applications operating on the target system 220, network connections associated with the target system 220, client devices 240 communication with the target system 220, or states of parameters of the target system 220.

As further shown in FIG. 4, process 400 may include generating the system resource document identifying the set of resources of the target system (block 430). For example, the recovery system 210 (e.g., using processor 320 and/or memory 330) may generate the system resource document identifying the set of resources of the target system, as described above in connection with reference number 152 of FIG. 1A. As an example, the recovery system 210 may generate a set of files, which are encapsulated into a system resource document, representing the target system 220.

As further shown in FIG. 4, process 400 may include storing the system resource document in a recovery archive (block 440). For example, the recovery system 210 (e.g., using processor 320 and/or memory 330) may store the system resource document in a recovery archive, as described above in connection with reference number 152 of FIG. 1A. As an example, the recovery system 210 may store the system resource document in the recovery archive 230 for access in connection with an outage.

As further shown in FIG. 4, process 400 may include detecting, after storing the system resource document in the recovery archive, an outage event (block 450). For example, the recovery system 210 (e.g., using processor 320 and/or memory 330) may detect, after storing the system resource document in the recovery archive, an outage event, as described above in connection with reference number 160 of FIG. 1B. As an example, the recovery system 210 may fail to receive a message from the target system 220 during a configured period of time, which may indicate an outage associated with the target system 220.

As further shown in FIG. 4, process 400 may include obtaining, based on detecting the outage event, the system resource document from the recovery archive (block 460). For example, the recovery system 210 (e.g., using processor 320 and/or memory 330) may obtain, based on detecting the outage event, the system resource document from the recovery archive, as described above in connection with reference number 160 of FIG. 1B. As an example, the recovery system 210 may communicate with the recovery archive 230 to obtain the system resource document and files thereof.

As further shown in FIG. 4, process 400 may include failing over the set of resources of the target system to a new target system (block 470). For example, the recovery system 210 (e.g., using processor 320 and/or memory 330) may fail over the set of resources of the target system to a new target system, as described above in connection with reference number 162 and 164 of FIG. 1B. As an example, the recovery system 210 may transfer one or more programs or applications or client devices 240 from the target system 220 to a new target system 220.

As further shown in FIG. 4, process 400 may include transmitting a set of notifications associated with the new target system (block 480). For example, the recovery system 210 (e.g., using processor 320, memory 330, and/or communication component 360) may transmit a set of notifications associated with the new target system, as described above in connection with reference number 170 of FIG. 1C. As an example, the recovery system 210 may notify the new target system 220 or one or more applications thereof of the failover.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1C. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A recovery system for high availability system outage recovery, the recovery system comprising:
one or more memories; and
one or more processors, communicatively coupled to the one or more memories, configured to:
communicate, based on a trigger to generate a system resource document for a target system, with a set of resources of the target system to perform an auto-discovery procedure;
generate, based on a result of the auto-discovery procedure, the system resource document identifying the set of resources of the target system;
store, after validating one or more network addresses associated with the target system in a recovery archive, the system resource document and the one or more network addresses;
obtain, after storing the system resource document and the one or more network addresses associated with the target system in the recovery archive, and based on an outage event, the system resource document from the recovery archive; and
transmit a set of signals to execute a set of recovery actions on the set of resources of the target system, using the system resource document recovered from the recovery archive, to re-instantiate one or more resources, of the set of resources, on a new target system,
wherein executing the set of recovery actions includes rerouting inbound traffic associated with the set of resources to the new target system based on the one or more network addresses stored prior to the outage event.

2. The recovery system of claim 1, wherein the one or more processors, to transmit the set of signals to execute the set of recovery actions, are configured to:
identify, using the system resource document, a class of a resource of the set of resources; and
transmit a signal, of the set of signals, to execute a recovery action, of the set of recovery actions, associated with the class of the resource.

3. The recovery system of claim 2, wherein the class of the resource is a particular class, and
wherein the one or more processors, to transmit the signal to execute the recovery action, are configured to:
fail over the resource from the target system to the new target system without stopping the inbound traffic associated with the resource based on the class of the resource being the particular class.

4. The recovery system of claim 2, wherein the class of the resource is a particular class, and
wherein the one or more processors, to transmit the signal to execute the recovery action, are configured to:
stop the inbound traffic associated with the resource based on the class of the resource being the particular class;
fail over the resource from the target system to the new target system based on stopping the inbound traffic associated with the resource; and
resume the inbound traffic associated with the resource based on failing over the resource.

5. The recovery system of claim 1, wherein the outage event is a testing event, and
wherein the one or more processors are further configured to:
receive information identifying a timing periodicity for the testing event; and
trigger the outage event based on the timing periodicity for the testing event.

6. The recovery system of claim 5, wherein the one or more processors, to trigger the outage event, are configured to:
detect an availability period during which the target system is configured to be available; and
trigger the outage event outside the availability period.

7. The recovery system of claim 1, wherein the outage event is a non-testing event, and
wherein the one or more processors are further configured to:
monitor, using the system resource document, a status of the set of resources of the target system; and
detect, based on monitoring the status of the set of resources of the target system, a change to the status of the set of resources of the target system.

8. The recovery system of claim 1, wherein the one or more processors are further configured to:
establish a periodicity for triggering the outage event;
attempt to receive a signal canceling the outage event during a period of time associated with the periodicity for triggering the outage event; and
detect the outage event at an end of the period of time based on whether the signal canceling the outage event is received.

9. A non-transitory computer-readable medium storing a set of instructions, the set of instructions comprising:
one or more instructions that, when executed by one or more processors of a recovery system, cause the recovery system to:
auto-discover, based on a trigger to generate a system resource document for a target system, a set of resources of the target system;
generate, for the set of resources of the target system, a set of auto-discovery files;
encapsulate the set of auto-discovery files in the system resource document;
store, after validating one or more network addresses associated with the target system in a recovery archive, the system resource document and the one or more network addresses associated with the target system in a recovery archive;
obtain, after storing the system resource document and the one or more network addresses associated with the target system in the recovery archive, and based on an outage event, the system resource document from the recovery archive; and transmit a set of signals to cause a set of recovery actions on the set of resources of the target system, using the set of auto-discovery files encapsulated in the system resource document to re-instantiate one or more resources, of the set of resources, on a new target system, wherein the set of recovery actions includes rerouting inbound traffic associated with the set of resources to the new target system based on the one or more network addresses stored prior to the outage event.

10. The non-transitory computer-readable medium of claim 9, wherein the one or more instructions, when executed by the one or more processors of the recovery system, further cause the recovery system to:

transmit information identifying the new target system to one or more client devices associated with the target system.

11. The non-transitory computer-readable medium of claim 10, wherein set of attributes includes at least one of:

a resiliency tier attribute, a domain name service (DNS) mapping attribute, a relational database service (RDS) attribute, or an endpoint attribute.

12. The non-transitory computer-readable medium of claim 10, wherein the set of resources includes a set of cloud applications deployed on a cloud network associated with the target system.

13. The non-transitory computer-readable medium of claim 9, wherein the one or more instructions, that cause the recovery system to auto-discover the set of resources, cause the recovery system to:

auto-discover a plurality of different types of resources, the plurality of different types of resources including at least one of:

a datastore type of resource, an event type of resource, or an application programming interface type of resource.

14. The non-transitory computer-readable medium of claim 13, wherein the one or more instructions, when executed by the one or more processors, further cause the recovery system to:

update an existing system resource document periodically according to a configured periodicity.

15. The non-transitory computer-readable medium of claim 9, wherein the one or more instructions, when executed by the one or more processors, further cause the recovery system to:

establish a periodicity for triggering the outage event;

attempt to receive a signal canceling the outage event during a period of time associated with the periodicity for triggering the outage event; and detect the outage event at an end of the period of time based on whether the signal canceling the outage event is received.

16. A method, comprising:

communicating, by a recovery system and based on a trigger to generate a system resource document for a target system, with a set of resources of the target system to perform an auto-discovery procedure;

generating, by the recovery system based on a result of the auto-discovery procedure, the system resource document identifying the set of resources of the target system;

storing, by the recovery system and after validating one or more network addresses associated with the target system in a recovery archive, the system resource document and the one or more network addresses associated with the target system in a recovery archive;

obtaining, by the recovery system, after storing the system resource document and the one or more network addresses associated with the target system in the recovery archive, and based on an outage event, the system resource document from the recovery archive;

failing over, by the recovery system, the set of resources of the target system to a new target system, wherein failing over the set of resources includes rerouting inbound traffic associated with the set of resources to the new target system based on the one or more network addresses stored prior to the outage event; and transmitting, by the recovery system, a set of notifications associated with the new target system.

17. The method of claim 16, wherein failing over the set of resources comprises:

failing over a resource, of the set of resources, from the target system to the new target system without stopping the inbound traffic associated with the resource based on an attribute of the resource.

18. The method of claim 16, wherein failing over the set of resources comprises:

stopping the inbound traffic associated with a resource, of the set of resources, based on an attribute of the resource;

failing over the resource from the target system to the new target system based on stopping the inbound traffic associated with the resource; and resuming the inbound traffic associated with the resource based on failing over the resource.

19. The method of claim 16, wherein the outage event is a testing event, and further comprising:

receiving information identifying a timing periodicity for the testing event; and triggering the outage event based on the timing periodicity for the testing event.

20. The method of claim 19, wherein triggering the outage event comprises:

detecting an availability period during which the target system is configured to be available; and triggering the outage event outside the availability period.

* * * * *